United States Patent
Lange et al.

(10) Patent No.: US 6,580,527 B1
(45) Date of Patent: *Jun. 17, 2003

(54) METHOD AND ARRANGEMENT FOR SCANNING MASTERS

(75) Inventors: Helmut Lange, Schönkirchen (DE); Axel Heuer, Fahren (DE); Axel Gebhardt, Mönkeberg (DE)

(73) Assignee: Heidelberger Druckmaschinen Aktiengesellschaft, Heidelberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/406,002

(22) Filed: Sep. 24, 1999

(30) Foreign Application Priority Data

Sep. 30, 1998 (DE) .......................... 198 44 774
Aug. 4, 1999 (DE) .......................... 199 36 622

(51) Int. Cl.$^7$ ................................. H04N 1/04
(52) U.S. Cl. ................ 358/493; 358/484; 358/487; 358/489; 358/490
(58) Field of Search ............... 358/493, 487, 358/484, 489, 490

(56) References Cited

U.S. PATENT DOCUMENTS

| | | | |
|---|---|---|---|
| 3,872,248 A | * 3/1975 | Winters | 358/472 |
| 4,568,984 A | * 2/1986 | Juergensen et al. | 358/484 |
| 4,742,401 A | * 5/1988 | Andree et al. | 358/493 |
| 4,897,737 A | * 1/1990 | Shalev | 358/489 |
| 5,929,435 A | * 7/1999 | Han | 250/234 |

* cited by examiner

Primary Examiner—Edward Coles
Assistant Examiner—H. Safaipour
(74) Attorney, Agent, or Firm—Schiff Hardin & Waite

(57) ABSTRACT

In a method and apparatus for point-by-point and line-by-line scanning of masters chucked on a scanner drum, for pixel-by-pixel illumination of the master, a light spot is generated with a light conductor, the light spot being imaged by a matching objective onto the master as an illumination spot. The scan light is focused with a scanner objective and is converted into an image signal in an opto-electronic scanner element. The illumination spot, scanner objective, and scanner element implement a feed motion in the direction of the rotational axis of the scanner drum for planar scanning of the master. Given employment of scanner drums having different diameters, the size of the illumination spot is corrected by a modification of the imaging scale of the light spot. The modification of the imaging scale occurs by displacing the light conductor with an actuating drive relative to the stationary matching objective. A corresponding focus correction occurs with a radial displacement of the scanner objective.

25 Claims, 4 Drawing Sheets

METHOD AND ARRANGEMENT FOR SCANNING MASTERS

BACKGROUND OF THE INVENTION

The invention is in the field of electronic reproduction technology and is directed to a method and to an apparatus for pixel-by-pixel and line-by-line, opto-electronic scanning of masters chucked on a scanner drum. Such a drum scanner unit, referred to below as a drum scanner, can be designed for scanning black-and-white or chromatic originals in reflected light and/or transmitted light.

A drum scanner for scanning transparency masters is composed, for example, of a rotating, transparent scanner drum onto which a transparency master to be scanned is chucked, a light source for pixel-by-pixel illumination of the transparency master, and of a scanner element having a scanner objective, a scanner diaphragm and an opto-electronic transducer for converting the scan light allowed to pass by the transparency master into an image signal that represents the luminance values of the scanned pixels.

The light required for the pixel-by-pixel illumination of the transparency master, for example, is transported via a light conductor from a light source located outside the scanner drum into the hollow-cylindrical interior of the scanner drum and is imaged onto the transparency master thereat as an illumination spot with a matching objective and a deflection mirror. The scan light modulated with the image content of the transparency original proceeds through the scanner objective into the scanner element located outside the scanner drum and is converted therein into an image signal by opto-electronic conversion.

The scanner element on the one hand and the optical elements on the other hand are respectively secured to an arm of a feed support designed U-shaped, whereby the arm carrying the optical elements projects into the scanner drum at the end face. For planar scanning of the transparency master, the feed support moves in the axial direction of the rotating scanner drum.

In order to be able to scan masters having different formats, scanner drums having different diameters are usually included in the equipment delivered with a drum scanner, these being chucked into the drum scanner dependent on the format of the master to be scanned. In this case, sets of lenses must be manually replaced at the feed support for optimum setting of the size of the illumination spot on the transparency master in order to compensate the different radial spacings between the central arm of the feed support and the generated surface of the respective scanner drum. For optimum focusing of the luminance-modulated scan light onto the scanner diaphragm, the scanner element of a traditional drum scanner is equipped with interchangeable lenses that must be manually pivoted into the beam path dependent on the diameter of the scanner drum employed. The employment of such sets of lenses and interchangeable lenses is relatively complicated.

SUMMARY OF THE INVENTION

It is therefore an object of the invention to improve a method and an apparatus for pixel-by-pixel and line-by-line, opto-electronic scanning of masters chucked on a scanner drum such that optical adaptations given employment of scanner drums having different diameters can be implemented in a simple way and automatically to the farthest-reaching extent.

This object is achieved by a method for point-by-point and line-by-line, opto-electronic scanning of a master, wherein the master is chucked on a scanner drum. A light spot is generated for pixel-by-pixel illumination of the master and is imaged onto the master as an illumination spot. The scan light is modulated with a content of the master, the scan light is focused with a scanner objective, and is converted into an image signal in an opto-electronic scanner element. The illumination spot, the scanner objective, and the scanner element implement the feed motion in a direction of the rotational axis of the scanner drum for scanning of the master. By employing scanner drums having different diameters, a size of the illumination spot is corrected by modifying an imaging scale of the illumination spot. An apparatus is also provided according to the invention for performing the above method steps.

DESCRIPTION OF THE PREFERRED EMBODIMENTS

Figure 1:
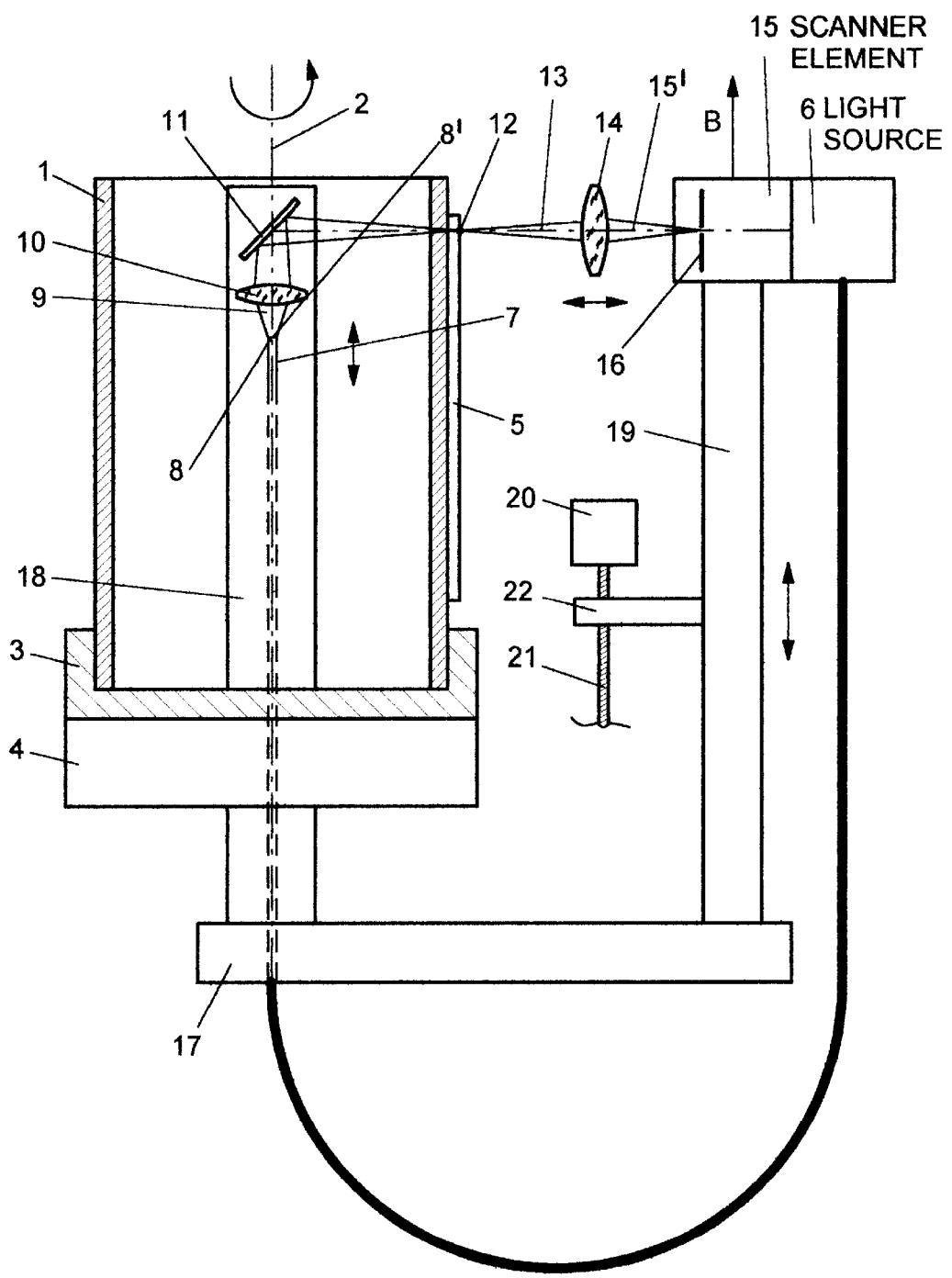
FIG. 1 shows the fundamental structure of a drum scanner.

FIG. 1 shows the fundamental structure of a drum scanner. A transparent scanner drum 1 having, for example, a vertical rotational axis 2 is coupled to a rotational drive 4 with a clamp mechanism 3. The rotational axis 2 of the scanner drum 1 can also be arranged horizontally or at an arbitrary angle relative to the floor space of the drum scanner.

A transparency master 5 is mounted on the scanner drum 1. For scanning transparency masters 5 having different formats, scanner drums 1 having different diameters are chucked into the drum scanner with the assistance of the clamp mechanism 3. The clamp mechanism 3 is constructed, for example according to German Utility Model 296 23 523 and the rotational drive is constructed according to German published application 196 01 524.

For pixel-by-pixel illumination of the transparency master 5, an illumination unit 7, 8, 10, 11 is provided in the hollow-cylindrical interior of the scanner drum 1, this illumination unit being supplied by a light source 6 located outside the scanner drum 1. A light beam generated by the light source 6 is transported by a light conductor 7 into the illumination unit and emerges in the direction of the rotational axis 2 through a light exit face 8 of the light conductor 7. The light beam 9 that has emerged is deflected in radial direction onto the transparency master 5 with a matching objective 10 in the rotational axis 2 and a deflection mirror 11 arranged at 45° relative to the rotational axis 2, as a result whereof a light spot 8' in the light exit face 8 of the light conductor 7 is imaged onto the transparency master 5 as illumination spot 12.

The scan light 13 that has been allowed to pass by the transparency master 5 and that is modulated with the luminance values of the scanned picture elements proceeds through a scanner objective 14 into a scanner element 15 located outside the scanner drum 1 and having a scanner diaphragm 16 and an opto-electronic transducer not shown, whereby illumination spot 12 and scanner objective 14 lie on the optical axis 15' of the scanner element 15 that proceeds radially relative to the scanner drum 1.

In the scanner element 15, the scan light 13 is converted with the opto-electronic transducer into an image signal B for further processing. Scanner element 15 and light source 6 are structurally united in the illustrated exemplary embodiment. Scanner objective 14, scanner element 15 and light source 6 move axially along the rotating scanner drum 1 for planar master scanning.

So that the illumination spot 12 in the planar master scanning always lies in the optical axis 15' of the scanner element 15, at least the deflection mirror 11—the illumination unit with light conductor 7, matching objective 10 and deflection mirror 11 in the exemplary embodiment—must be entrained in axial direction synchronously with the scanner objective 14 and the scanner element 15. To that end, a U-shaped feed support 17 having an inside arm 18 and an outside arm 19 is present, this being moved during the master scanning in axial direction of the scanner drum 1 by a feed drive 20 with the assistance of a spindle 21 and a nut segment 22 located at the feed support 17. The inside arm 18 of the feed support 17 is guided by the rotational drive 4, has its end face projecting into the scanner drum 1, and extends along the rotational axis 2. The inside arm 18 carries the illumination unit 7, 8, 10, 11. The outside arm 19 of the feed support 17 proceeding parallel to the inside arm carries the scanner objective 14, the scanner element 15 and the light source 6.

For scanning opaque masters, a reflected light illumination not shown is provided that generates a corresponding illumination spot 12 on the opaque master. In this case, the modulated scan light 13 reflected by the opaque master to be scanned is converted into an image signal B in the scanner element 15.

When scanner drums 1, 1' having different diameters are chucked in the drum scanner, the distance between the deflection mirror 11 and the opaque master 5 mounted on the scanner drum 1 as well as the distance between the transparency master 5 and the scanner diaphragm 16 in the scanner element 15 change. In this case, the size of the illumination spot 12 on the transparency master 5 and the focusing of the scan light 13 onto the scanner diaphragm 16 coming from the transparency master 5 must be corrected.

The size correction of the illumination spot 12 on the transparency master 5 advantageously ensues with an automatic modification of the imaging scale with which the light spot 8' of the light exit face 8 of the light conductor 7 is imaged on the transparency master 5 as illumination spot 12. The modification of the imaging scale is preferably achieved by modifying the distance between the light exit face 8 of the light conductor 7 and the matching objective 10 stationarily secured to the inside arm 18, preferably by displacing the light conductor 7 on the inside arm 18 in the direction of the rotational axis 2 of the scanner drum 1 in axial working positions $A_k$ and $A_g$ that are prescribed by the diameter of the scanner drums 1, 1' respectively employed, as a result whereof an optimum illumination of the transparency master 5 is achieved given employment of scanner drums 1, 1' having different diameters.

The re-correction of the focusing of the scan light 13 on the scanner diaphragm 16 in the scanner element 15 occurs by modifying the radial distance between the generated surface of the respective scanner drum 1, 1' and the scanner objective 14 by displacing the scanner objective 14 into radial working positions $B_k$ and $B_g$ that are prescribed by the diameter of the respectively employed scanner drum 1, 1'.

Figure 2:
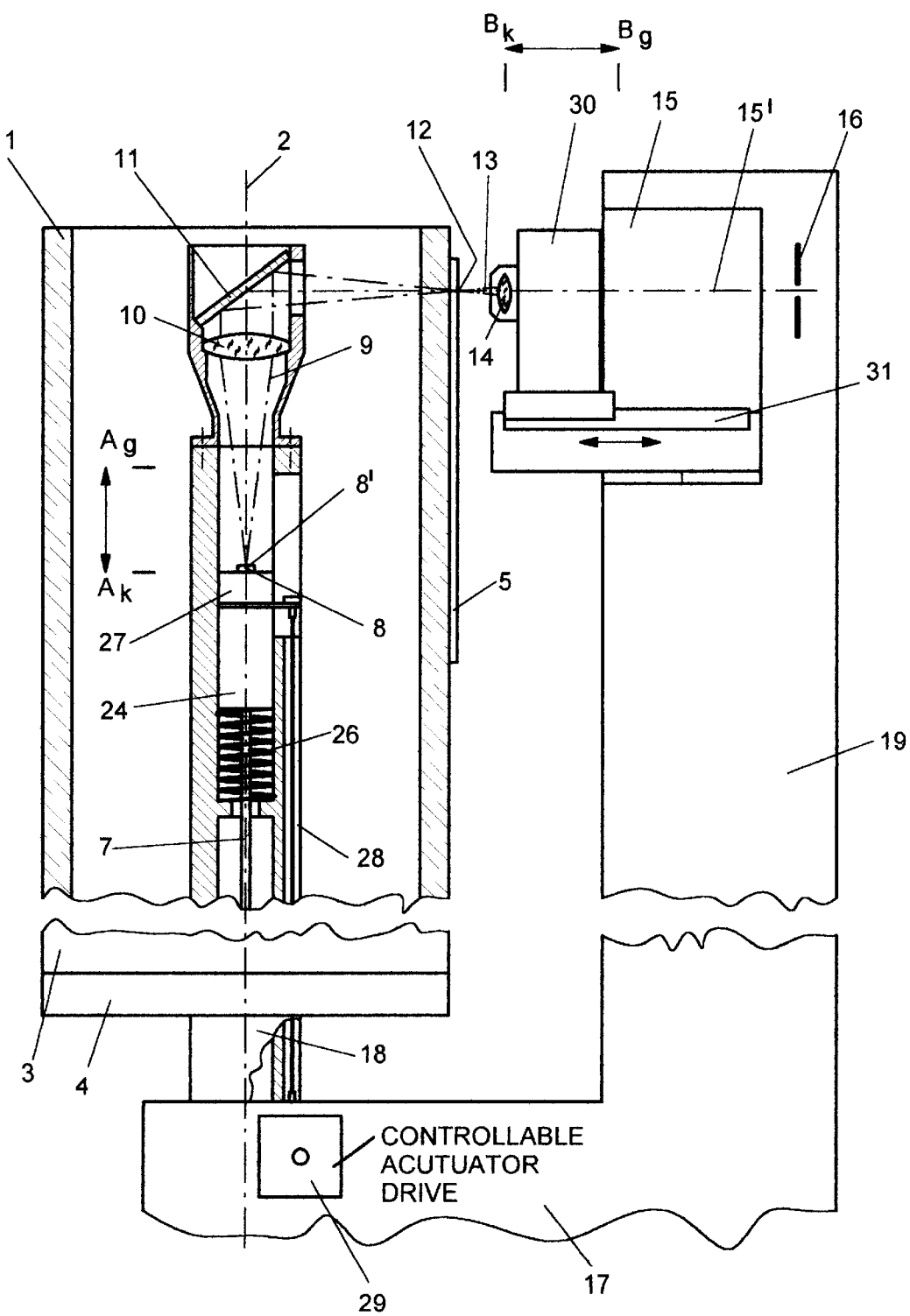
FIG. 2 is an exemplary embodiment of the devices for axial displacement of a light conductor and for radial displacement of a scanner objective as well as the positioning of the light conductor and of the scanner objective given employment of a scanner drum having a small diameter.

FIG. 2 shows an exemplary embodiment for the devices for axial displacement of the light conductor 7 at the inside arm 18 and for radial displacement of the scanner objective 14 at the outside arm 19 of the feed support 17, as well as the positioning of the light conductor and of the scanner objective given employment of a scanner drum 1 having a small diameter.

The end region of the light conductor 7 having the light exit face 8 is enveloped by a cylindrical light guide mount 24 that is seated in sliding fashion in the hollow-cylindrical inside arm 18 of the feed support 17. A compression spring 26 is arranged between a recess 25 at the inside wall of the inside arm 18 and the light conductor mount 24. A radial finger 27 is attached to the light conductor mount 24, this being connected to a controllable actuator drive 29 via a tension cable 28 proceeding in the direction of the inside arm 18. The actuator drive 29 is, for example, a stepping motor that drives a cable drum. The actuator drive 29 is preferably attached to the feed support 17. The light conductor mount 24 and, thus, the light exit face 8 of the light conductor 17 is automatically displaced with the controllable actuator drive 29 and the tension cable 28 into one of the two axial working positions $A_k$ or $A_g$ corresponding to the diameter of the scanner drum 1, 1' used at the moment—into the axial working position $A_k$ for the scanner drum 1 having a small diameter in the illustrated example—being displaced opposite the force of the compression spring 26 and being fixed thereat.

The scanner objective 14 is mounted on an objective holder 30 that, using guides 31, is displaced onto one of the two radial working positions $B_g$ or $B_k$ corresponding to the diameter of the scanner drum 1, 1' employed at the moment—into the radial working position $B_k$ for the scanner drum 1 having the small diameter in the illustrated example—being displaced with an actuator drive not shown and fixed thereat.

Figure 3:
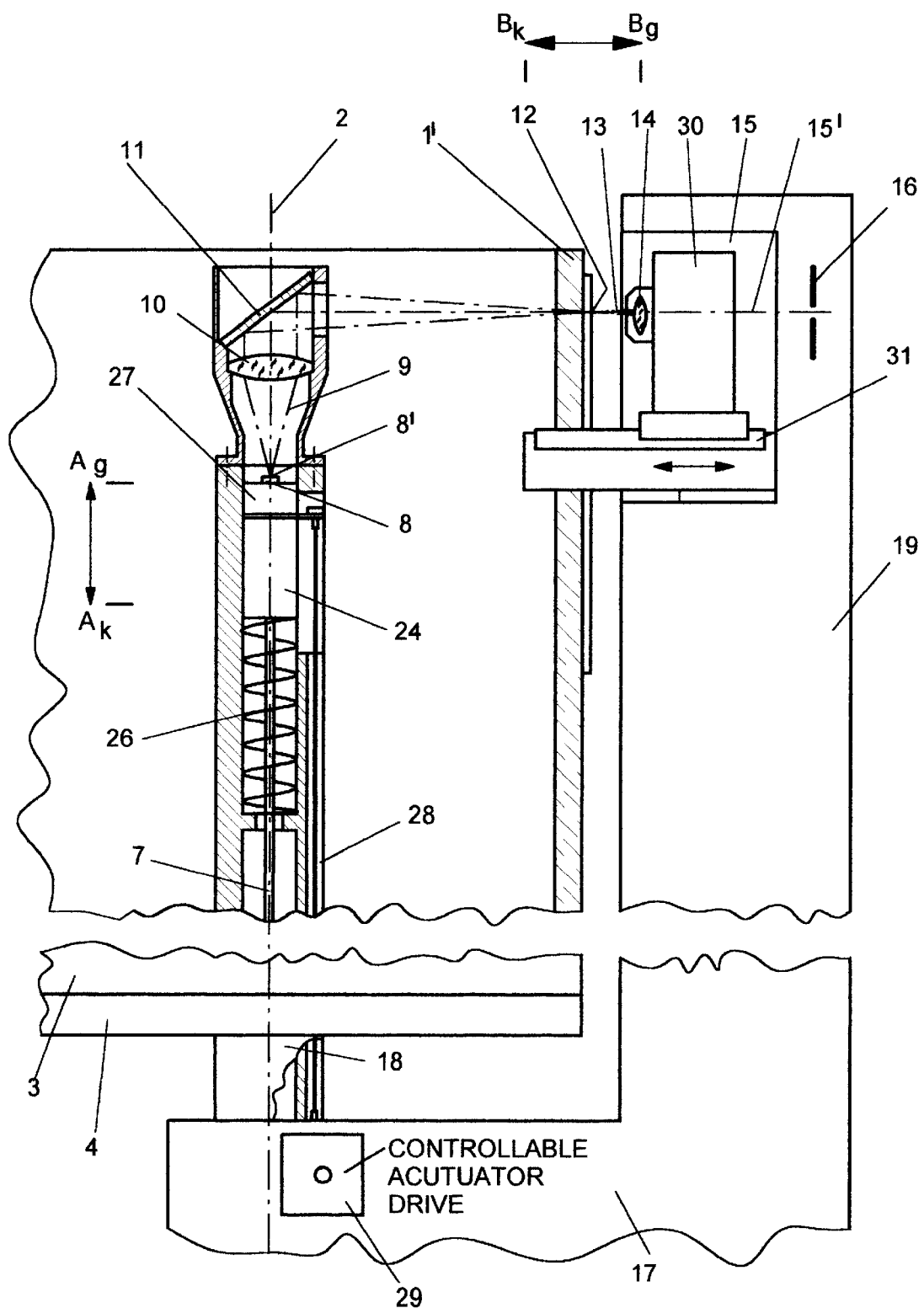
FIG. 3 shows the positioning of the light conductor and of the scanner objective given employment of a scanner drum with a large diameter.

FIG. 3 shows the position of the light conductor 7 and of the scanner objective 14 given employment of a scanner drum 1' having a large diameter. In this case, the exit face 8 of the light conductor 7 is displaced into the axial working position $A_g$ and the objective holder 30 with the scanner objective 14 is displaced into the radial working position $B_g$.

It can be seen from FIGS. 2 and 3 that a respectively optimum size of the illumination spot 12 and an optimum focusing of the scan light 13 onto the scanner element 15 is advantageously achieved given different diameters of the scanner drums 1, 1'.

Figure 4:
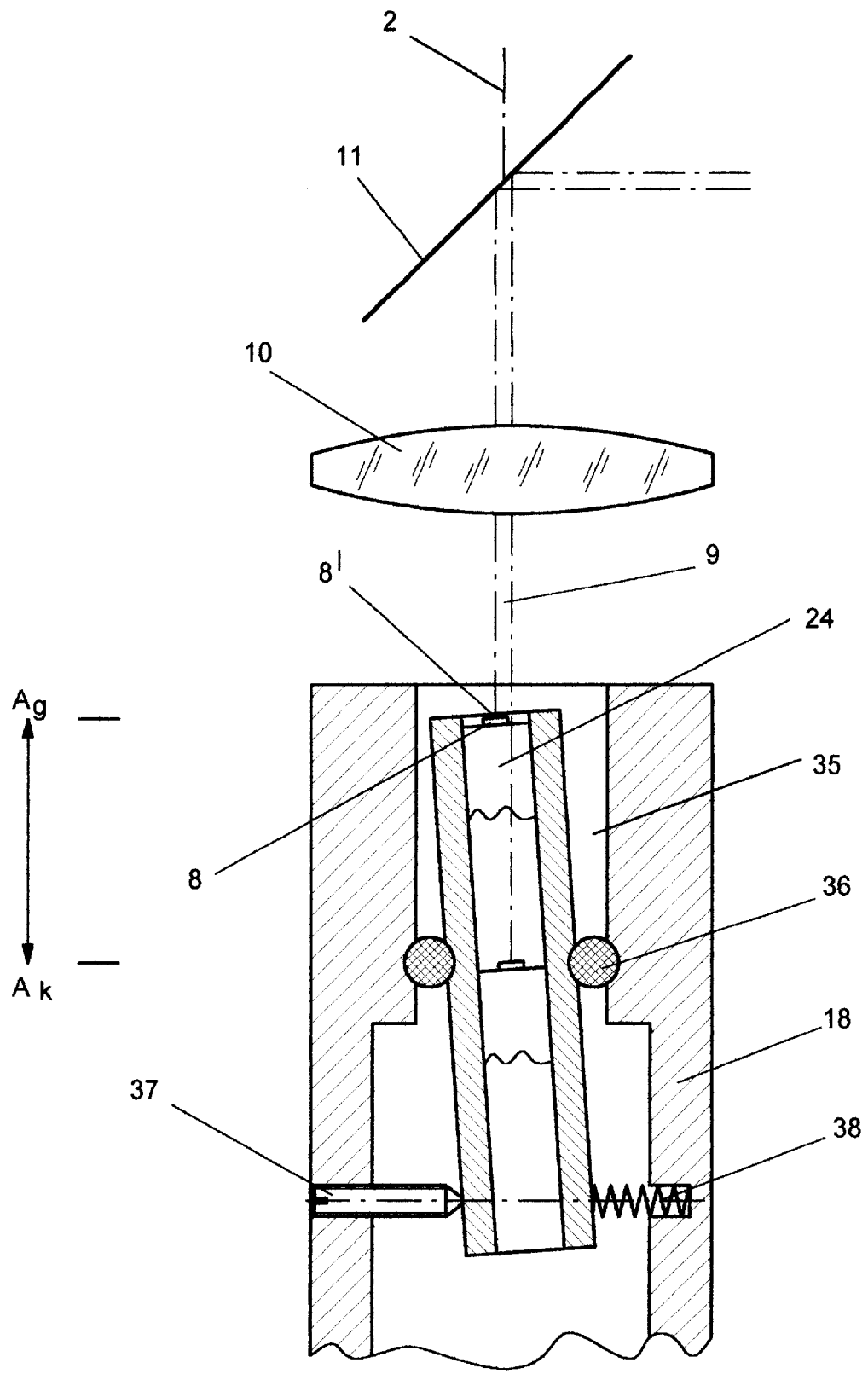
FIG. 4 is an exemplary embodiment of an apparatus for the correction of optical beam paths.

FIG. 4 shows an advantageous development of the apparatus for displacing the light conductor 7. The development is an additional correction system for the optical beam paths in the two axial working position $A_k$ and $A_g$ of the light exit face 8 of the light conductor 7.

The correction system is composed of a hollow-cylindrical adjustment sleeve 35 in whose interior the light conductor mount 24 of the light conductor 7 is guided in sliding fashion and can be displaced essentially in the direction of the rotational axis 2 onto the two axial working positions $A_k$ and $A_g$.

The adjustment sleeve 35 is pendularly seated inside the hollow cylindrical arm 18 of the feed support 17 with a Cardanic bearing. The Cardanic bearing 36 is realized, for example, by a rubber ring, for example an O-ring. Due to the pendular bearing 36, the adjustment sleeve 35 can be inclined by small angles, as a result whereof the light exit face 8 of the light conductor 7 can be displaced by small amounts in two coordinate directions in a plane perpendicular to the rotational axis 2 of the scanner drum 1 for the purpose of implementing fine adjustments. As a result thereof, the light beam 9 emerging from the light exit face 8 is displaced nearly parallel to the rotational axis 2, and the illumination spot 12 is displaced such on the transparency master 5 such that the illumination spot 12—in the different radial working positions $B_k$ and $B_g$ of the scanner objective 14—always centrally and, thus, optimally illuminates the scanner diaphragm 16 in the scanner element 15 despite existing, mechanical and/or optical tolerances.

The slant of the adjustment sleeve 35 within the inside arm 18 and, thus, the displacement of the light beam 9 is modified, for example, by two adjustment screws 37 in conjunction with a compression spring 38. The optimum position is fixed by the adjustment screws, whereby the two adjustment screws 37 and the compression spring 38 attack at the circumference of the adjustment sleeve 35 respectively offset by 120°.

In a preferred way, the plane of the Cardanic bearing 36 Cardanic axis of the adjustment sleeve 35 is located in one of the axial working positions $A_k$ or $A_g$ of the light exit face 8 of the light conductor 7, for example in the axial working position $A_k$ for the scanner drum 1 having the smaller diameter. For this axial working position $A_k$, the optimum position of the light exit face 8 is determined by a single-time, mechanical adjustment of the overall inside arm 18 of the feed support 17, that is also maintained given repeated approach of this selected, axial working position $A_k$. Only the locating of the optimum position of the light exit face 8 in the other axial working position $A_g$ thus occurs with the adjustment sleeve 35, whereby the adjustment for the selected, axial working position $A_g$ is maintained, so that an involved, iterative setting to the two axial working positions $A_g$ and $A_k$ is advantageously illuminated.

Although various minor modifications might be suggested by those skilled in the art, it should be understood that our wish to embody within the scope of the patent warranted hereon all such modifications as reasonably and properly come with the scope of our contribution to the art.

We claim as our invention:

1. A method for point-by-point and line-by-line, opto-electronic scanning of a master, comprising the steps of:
    chucking the master on a scanner drum;
    generating a light spot with a scan light for pixel-by-pixel illumination of the master and imaging it onto the master as an illumination spot;
    modulating the scan light with a content of the master, focusing the scan light with a scanner objective and converting it into an image signal in an opto-electronic scanner element;
    implementing a feed motion with the illumination spot, the scanner objective and the scanner element in a direction of the rotational axis of the scanner drum for scanning of the master; and
    when employing scanner drums having different diameters, correcting a size of the illumination spot by modifying an imaging scale of the illumination spot.

2. The method according to claim 1 wherein:
    the light spot is imaged onto the master as the illumination spot with a matching objective; and
    the imaging scale is modified by modifying a distance of the light spot from the matching objective.

3. The method according to claim 2 wherein the distance of the light spot from the matching objective is modified by displacing the light spot.

4. The method according to claim 2 wherein:
    the light spot is generated at a light exit window of a light conductor; and
    the distance between light spot and matching objective is modified by displacing the light conductor.

5. The method according to claim 1 wherein:
    the light conductor is arranged substantially in the direction of the rotational axis of the scanner drum;
    the light conductor is displaced in the direction of the rotational axis into an axial working position determined by the diameter of the respective scanner drum; and
    the imaging of the light spot as the illumination spot occurs with a deflection mirror onto the scanner drum.

6. The method according to claim 1 wherein the focusing of the scan light onto the scanner element given employment of scanner drums with different diameters is corrected by displacement of the scanner objective in a direction of an optical axis of the scanner element into a radial working position determined by the diameter of the respective scanner drum.

7. The method according to claim 1 wherein:
    the scanner drums are designed transparent for scanning transparency masters;
    the light spot is generated within the respective scanner drum; and
    the scanning of the transparency master occurs with the scanner element arranged outside the respective scanner drum.

8. An apparatus for point-by-point and line-by-line, opto-electronic scanning of a master, comprising:
    a scanner drum for chucking a master to be scanned;
    an illumination unit for generating an illumination spot on the master by imaging a light spot onto the master;
    a scanner objective;
    a scanner element for conversion of scan light modulated with a content of the master and focused with the scanner objective into an image signal;
    a feed support at which the illumination unit for generating the light spot, the scanner objective and the scanner element are arranged, whereby the feed support implements a feed motion in a direction of a rotational axis of the scanner drum for scanning of the master; and
    the illumination unit is designed such that a size of the illumination spot given employment of scanner drums having different diameters is corrected by a modification of an imaging scale of the illumination spot.

9. The apparatus according to claim 8 wherein:
    the scanner drums are designed transparent for scanning transparency masters;
    the feed support displaceable in the direction of the rotational axis of the respective scanner drum comprises first and second arms proceeding parallel to the rotational axis, whereof one arm projects centrally from an end face into the respective scanner drum;
    the second arm carries the scanner objective and the scanner element and the first arm carries the illumination unit for generating the illumination spot;
    the illumination unit is composed of a matching objective lying on the rotational axis, of a deflection mirror oriented transversely relative to the rotational axis, and a light conductor having a light exit face;

at least a sub-section of the light conductor is seated displaceable in the direction of the rotational axis relative to the matching objective in a region of the light exit face at the first arm carrying the illumination unit; and a structure is provided that displaces the light conductor onto axial working positions predetermined by the diameter of the respective scanner drum for modifying the imaging scale of the illumination spot.

10. The apparatus according to claim 9 wherein the structure for displacing the light conductor is actuated by an actuator drive.

11. The apparatus according to claim 10 wherein the actuating drive is attached to the feed support.

12. The apparatus according to claim 9 wherein:

an end region of the light conductor is enveloped by a cylindrical light conductor mount at the light exit face;

at least the first arm of the feed support carrying the light conductor is designed hollow-cylindrical fashion in regions;

the light conductor mount is seated in sliding fashion in an interior of the hollow-cylindrical region of the first arm;

the light conductor mount is supported by a compression spring located in the interior of the first arm and enveloping the light conductor; and the light conductor mount is connected via connecting elements to the actuating drive, as a result whereof the light conductor mount and the light conductor are displaceable into the axial working positions against a force of the compression spring.

13. The apparatus according to claim 9 wherein the first arm of the feed support carrying the illumination unit projects as an inside arm into the respective scanner drum at the end face.

14. The apparatus according to claim 9 wherein:

the respective scanner drum can be clamped into the apparatus with a clamp mechanism;

the clamp mechanism is rotatorily driven by a rotational drive; and the inside arm of the feed support is guided into the scanner drum by the rotational drive and the clamp mechanism.

15. The apparatus according to claim 8 through wherein the illumination unit is supplied via a light guide by a light source located at the feed support.

16. The apparatus according to claim 8 wherein:

the scanner objective is mounted on an objective holder seated displaceably in a direction of an optical axis; and the objective holder together with the scanner objective is displaced into a specific, radial working position determined by a diameter of the respective scanner drum for correction of focusing of the scan light onto the scanner element given employment of scanner drums having different diameters.

17. The apparatus according to claim 16 wherein the objective holder is displaced with an actuating drive.

18. The apparatus according to claim 8 wherein the rotational axis of the respective scanner drum is directed perpendicular to the floor space of the scanning apparatus.

19. The apparatus according to claim 9 wherein at least a sub-section of a light conductor is seated inclinable by small angles relative to the rotational axis in the region of the light exit face for fine adjustment of optical beam paths, as a result whereof the illumination spot is displaced on the scanner drum.

20. The apparatus according to claim 19 wherein the sub-section of the light conductor is seated in pendulum fashion with a Cardanic bearing 36.

21. The apparatus according to claim 19, wherein a fixing unit is present with which an optimum slope of the light conductor is fixed.

22. The apparatus according to claim 20 wherein a plane of the Cardanic bearing lies in one of axial working positions.

23. The apparatus according to claim 9 wherein:

a light conductor holder of the light conductor is seated displaceable onto axial working positions in an inside of a hollow-cylindrical adjustment sleeve; and the adjustment sleeve is pendularly seated around the rotational axis by small angles with a Cardanic bearing in a hollow-cylindrical interior of the arm.

24. A method for opto-electronic scanning of a master, comprising the steps of:

attaching the master on a scanner drum;

generating a scan light for point-by-point illumination of the master and imaging it onto the master as an illumination spot;

modulating the scan light with a content of the master, focusing the scan light, and converting it into an image signal in an opto-electronic scanner element;

implementing a feed motion with the illumination spot, and the scanner element in a direction of the rotational axis of the scanner drum for scanning of the master; and when employing scanner drums having different diameters, correcting a size of the illumination spot by modifying an imaging scale of the illumination spot.

25. An apparatus for scanning of a master, comprising:

a scanner drum for mounting a master to be scanned;

an illumination unit for generating an illumination spot on the master by imaging a light spot onto the master;

a scanner element for conversion of scan light modulated with a content of the master into an image signal;

a feed support at which the illumination unit for generating the light spot and the scanner element are arranged, whereby the feed support implements a feed motion in a direction of a rotational axis of the scanner drum for scanning of the master; and the illumination unit is designed such that a size of the illumination spot given employment of scanner drums having different diameters is corrected by a modification of an imaging scale of the illumination spot.

* * * * *